(12) United States Patent
Jung et al.

(10) Patent No.: US 10,124,780 B2
(45) Date of Patent: Nov. 13, 2018

(54) METHOD FOR CONTROLLING COUNTER STEERING OF VEHICLE DURING ABS BRAKING

(71) Applicant: Hyundai Motor Company, Seoul (KR)

(72) Inventors: In Yong Jung, Incheon (KR); Dong Hoon Kang, Suwon-si (KR); Sang Hyup Lee, Bucheon-si (KR); Joon Sang Jo, Yongin-si (KR); Kyun Sang Park, Anseong-si (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 15/370,234

(22) Filed: Dec. 6, 2016

(65) Prior Publication Data

US 2017/0259796 A1    Sep. 14, 2017

(30) Foreign Application Priority Data

Mar. 8, 2016 (KR) .................. 10-2016-0027672

(51) Int. Cl.
*B60T 8/24* (2006.01)
*B60T 8/1755* (2006.01)
*B60T 8/1761* (2006.01)

(52) U.S. Cl.
CPC ............ *B60T 8/241* (2013.01); *B60T 8/1755* (2013.01); *B60T 8/17616* (2013.01); *B60T 2201/16* (2013.01); *B60T 2220/03* (2013.01); *B60T 2250/03* (2013.01); *B60T 2270/10* (2013.01)

(58) Field of Classification Search
None
See application file for complete search history.

(56) References Cited

U.S. PATENT DOCUMENTS

2004/0107082 A1* 6/2004 Sato .................... B60T 8/17551
 703/8
2005/0187670 A1* 8/2005 Katayama ........... B60T 8/17551
 701/1

FOREIGN PATENT DOCUMENTS

| JP | 2004-210151 A | 7/2004 |
|---|---|---|
| KR | 10-0688451 B1 | 2/2007 |
| KR | 10-2007-0060851 A | 6/2007 |
| KR | 10-2012-0008621 A | 2/2012 |
| KR | 10-2012-0047108 A | 5/2012 |
| KR | 10-1300599 B1 | 8/2013 |
| KR | 10-2014-0031524 A | 3/2014 |

* cited by examiner

*Primary Examiner* — Lail A Kleinman
(74) *Attorney, Agent, or Firm* — Morgan, Lewis & Bockius LLP (57) ABSTRACT

Disclosed may be a method for controlling counter steering of a vehicle, which, in a counter steering section for controlling over-steer while a vehicle travels a curve, prevents lateral force from being decreased by maintaining a braking pressure according to an operation of an antilock braking system (ABS) for a vehicle wheel (a front axle curve-travelling outer wheel) of a counter steering target at an optimal slip level (before an improvement of a target slip), and improves steering performance by forming a linear yaw rate in a direction for counter steering without a delay in forming the yaw rate.

13 Claims, 6 Drawing Sheets

METHOD FOR CONTROLLING COUNTER STEERING OF VEHICLE DURING ABS BRAKING

CROSS-REFERENCE TO RELATED APPLICATION

The present application claims priority to Korean Patent Application No. 10-2016-0027672 filed on Mar. 8, 2016, the entire contents of which are incorporated herein by reference.

BACKGROUND OF THE INVENTION

Field of the Invention

The present invention relates to a method for controlling counter steering of a vehicle during antilock brake system (ABS) braking. More particularly, it relates to a method for controlling counter steering of a vehicle, which is configured for improving steering performance and stability by forming a linear yaw rate without a delay in forming a yaw rate in a counter steering section during ABS braking while the vehicle travels a curve.

Description of Related Art

As is well known, an antilock braking system (ABS), a vehicle dynamics control (VDC), and the like are mounted in a vehicle in order to increase safety during a driving of a vehicle.

The ABS is one of the braking safety devices preventing wheel lock during sudden braking, and is a control system which maximizes braking force by controlling a torque generated by a brake friction material during the brake and maintaining an appropriate wheel slip. In this case, lateral force is slightly decreased, but the tire may deal with the lateral force enough for a curve travelling.

Figure 1:
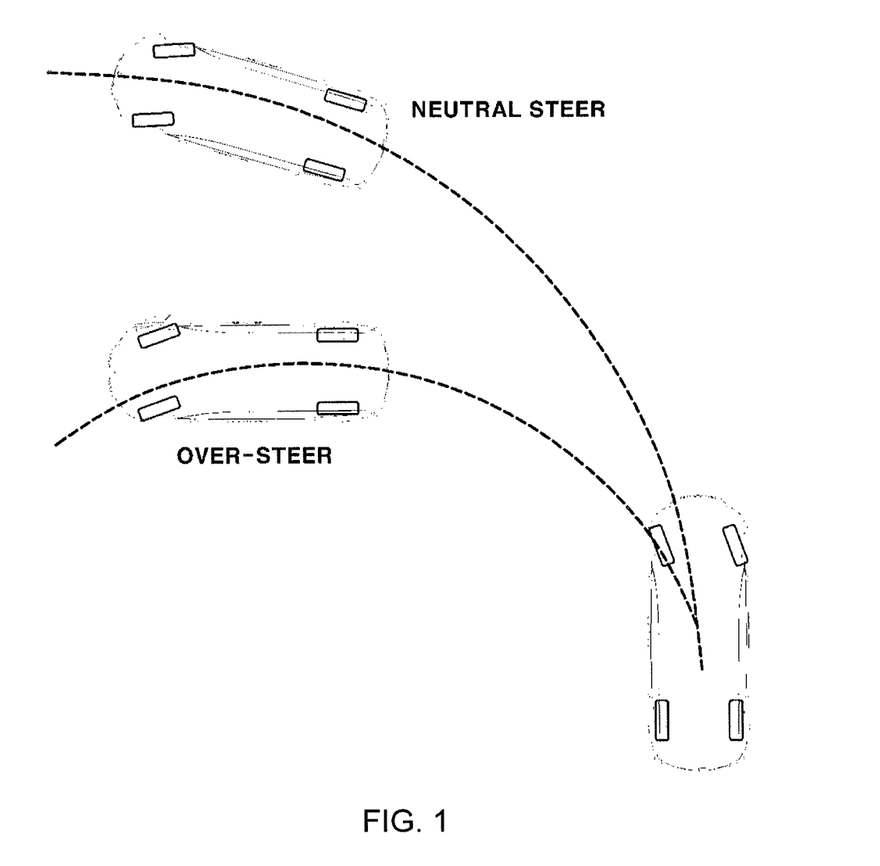
FIG. 1 is a conceptual diagram for describing an over-steer situation while a vehicle travels a curve during braking.

The VDC is one of safety devices which prevent a vehicle from turning over and secure safety of a vehicle by detecting side slip of the vehicle or the degree of rotation of the vehicle during travelling on a rainy road or a snowy road, or even on an irregular road, as well as a general asphalt road and independently adjusting a brake of each wheel, and is called an electronic stability control (ESC). For example, in a neutral steer situation (see FIG. 1) when the vehicle travels a curve, the vehicle has the appropriate degree of rotation, so that the ESC control is not required, but in an oversteer situation (see FIG. 1), a posture of the vehicle is controlled under the control for increasing a braking pressure for a curve travelling outer wheel of a front axle to help a driver, thereby increasing stability of the vehicle.

The ABS and the VDC are individually operated according to a travelling situation, but mutual cooperative control is performed in a counter steering section during the braking, and the like.

When an over-steer is generated in lane change during the braking of the vehicle, the ABS-VDC cooperative control of improving a braking pressure for a curve travelling outer wheel of a front axle of the vehicle, that is, a front axle curve-travelling outer wheel braking pressure, is performed by the wheel pressure control by the ABS and the VDC.

Figure 2:
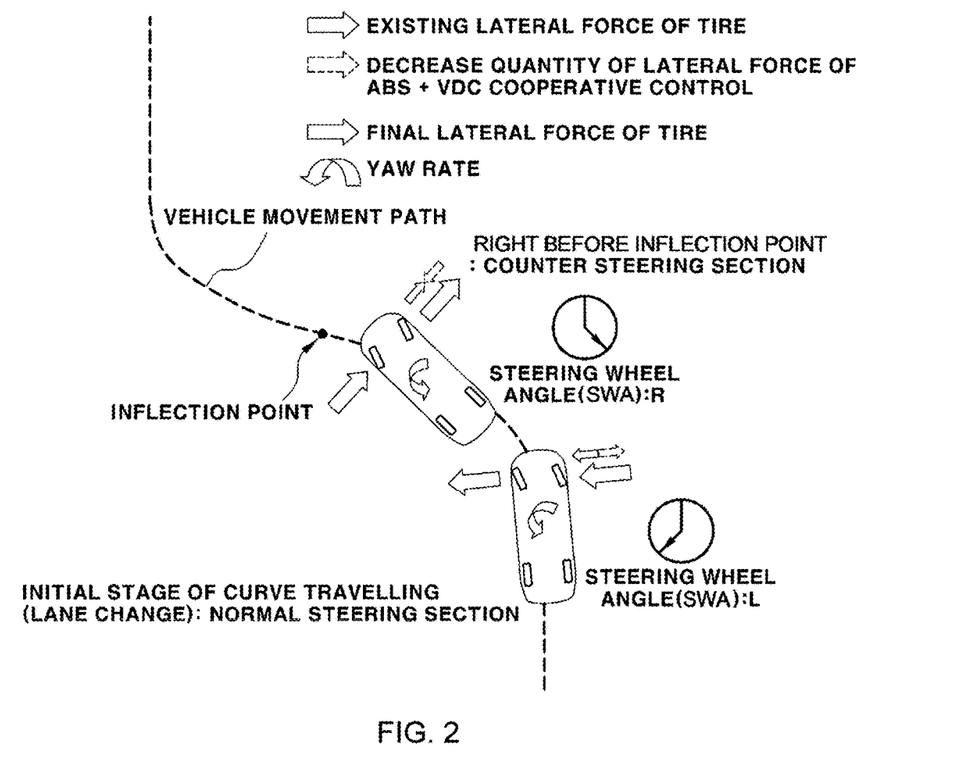
FIG. 2 is a conceptual diagram for describing a counter steering section while a vehicle travels a curve during braking.

Referring to FIG. 2, in a case of an initial stage of a lane change, in which a driver rotates a steering wheel to the left for changing a lane to a left lane, tires head to a left side and thus the vehicle also rotates to the left. This situation will be defined as a normal steer section. Then, the driver steers the vehicle to the right in order to smoothly enter the left lane while the lane is changed, and accordingly, the tires also head to a right side, and in this case, the vehicle rotates to the right with some time, so that at the moment at which the driver steers the vehicle to the right, there exists a section in which the vehicle rotates to the left (steering responsibility). Here, the moment, at which the rotation direction of the vehicle is opposite to the rotation direction of the tire (steering angle), will be defined as a counter steer, and a section of the counter steer will be defined as a counter steer section.

When an oversteer is generated in the normal steer section during the ABS braking, the VDC applies a braking control to the right front wheel (a curve travelling outer wheel) for restricting a yaw rate, and this decreases lateral force of the front wheel to be appropriately acted in a direction of suppressing the over steer.

However, when a curve-travelling outer wheel braking pressure is improved in order to control the over-steer in the counter steering section, already saturated braking force is not increased and the front wheel lateral force is rather decreased (see the graph of FIG. 3), and the forming of a yaw rate in a steering direction for the counter steering is delayed, so that a vehicle response different from a control intention of the VDC is made.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling counter steering of a vehicle during braking, which, in a counter steering section generated during a lane change while the vehicle brakes, prevents lateral force from being decreased by maintaining a braking pressure according to an operation of an antilock braking system (ABS) on a target wheel (front axle curve-travelling outer wheel) to maintain the slip of the wheel on optimal slip ratio level (before an improvement of a target slip), and improves steering performance by forming a linear yaw rate in a direction for counter steering without a delay in forming the yaw rate.

For this, various aspects of the present invention are directed to providing a method of controlling counter steering of a vehicle during braking, the method including: i) determining whether a situation is an over-steer situation while a vehicle brakes; ii) determining whether the vehicle enters a counter steering section from the over-steer situation; and iii) when it is determined that the vehicle enters the counter steering section in the over-steer situation, performing a wheel pressure control by an antilock braking system (ABS), in which a braking pressure for a vehicle wheel of a counter steering target is maintained at an optimal slip ratio level without an intervention of a vehicle dynamic control (VDC).

In an exemplary embodiment, in operation iii), when it is determined that the vehicle does not enter the counter steering section in the over-steer situation, a wheel pressure control by the VDC may be performed for the over-steer control.

In another exemplary embodiment, operation ii) may include: determining a counter steer index by multiplying a steering angle and a yaw rate value when the counter steering is performed in the over-steer situation; and when the determined counter steer index is less than 0 that is a reference value, determining that the counter steering is generated.

In still another exemplary embodiment, the method may further include: before operation iii), (a) predicting whether the counter steering is generated based on a steering angle and a yaw rate; and (b) when it is predicted that the counter steering is generated, performing the wheel pressure control by the ABS, in which the braking pressure for the vehicle wheel of the counter steering target is maintained at the optimal slip ratio level.

In yet another exemplary embodiment, operation (a) may include: determining a counter steer index by multiplying a steering angle when the counter steering is performed from the over-steer situation and a yaw rate value; and comparing the determined counter steer index with a reference value (a small value close to 0, and a positive number larger than 0), and predicting that the counter-steering is to be generated when the determined counter steer index is less than the reference value.

In still yet another exemplary embodiment, operation (a) may include: detecting a steering angle and a steering angle change rate in the over-steer situation; as a result of the detection, determining whether an absolute value of the steering angle is larger than a steering angle reference value, a value obtained by multiplying the steering angle and the steering angle change rate is less than zero (0), and an absolute value of the steering angle change rate is larger than a steering angle change rate reference value; and as a result of the determination, when the absolute value of the steering angle is larger than the steering angle reference value, the value obtained by multiplying the steering angle and the steering angle change rate is less than zero (0), and the absolute value of the steering angle change rate is larger than the steering angle change rate reference value, predicting that the counter steering is to be generated.

In a further exemplary embodiment, the wheel pressure control of the ABS may include applying a braking pressure obtained by multiplying a VDC target slip increase quantity and a counter steer slip gain to the vehicle wheel of the counter steering target.

In another aspect, various aspects of the present invention are directed to providing a method of controlling counter-steering of a vehicle, the method including: i) determining whether a situation is an over-steer situation while a vehicle brakes; ii) predicting whether counter steering is generated based on a steering angle and a yaw rate; and iii) when it is predicted that the counter steering is generated, performing a wheel pressure control by an antilock braking system (ABS), in which a braking pressure for a vehicle wheel of a counter steering target is maintained at an optimal slip ratio level.

In an exemplary embodiment of the present invention, operation ii) may include: determining a counter steer index by multiplying a steering angle when the counter steering is performed in the over-steer situation and a yaw rate value; and comparing the determined counter steer index with a reference value (a small value close to 0, and a positive number larger than 0), and predicting that the counter-steering is to be generated when the determined counter steer index is less than the reference value.

In another exemplary embodiment, operation ii) may include: detecting a steering angle and a steering angle change rate in the over-steer situation; as a result of the detection, determining whether an absolute value of the steering angle is larger than a steering angle reference value, a value obtained by multiplying the steering angle and the steering angle change rate is less than zero (0), and an absolute value of the steering angle change rate is larger than a steering angle change rate reference value; and as a result of the determination, when the absolute value of the steering angle is larger than the steering angle reference value, the value obtained by multiplying the steering angle and the steering angle change rate is less than zero (0), and the absolute value of the steering angle change rate is larger than the steering angle change rate reference value, predicting that the counter steering is to be generated.

In still another exemplary embodiment, the wheel pressure control of the ABS may include applying a braking pressure obtained by multiplying a VDC target slip increase quantity and a counter steer slip gain to the vehicle wheel of the counter steering target.

Through the aforementioned technical solutions, various aspects of the present invention are directed to providing the effects below.

First, when a vehicle enters the counter steering section for the control of the over-steer while the vehicle travels a curve during braking, a braking pressure for a vehicle wheel (for example, a front axis curve-travelling outer wheel) of a counter steering target is applied at an optimal slip ratio level by the control of the ABS (a level in which the braking force is maintained as it is, and lateral force is not decreased), thereby preventing the lateral force from being decreased, and thus improving steering performance by forming a linear yaw rate in a direction for the counter steering without a delay in forming the yaw rate.

Second, a desired ABS optimal slip control is more smoothly performed in an actual counter steering section by predicting whether a vehicle enters the counter steering section in an over-steer situation, thereby further preventing a decrease of lateral force (lateral force applied in an opposite direction of a curve-travelling direction), and improving steering performance by forming a linear yaw rate in a direction for the counter steering.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 4:
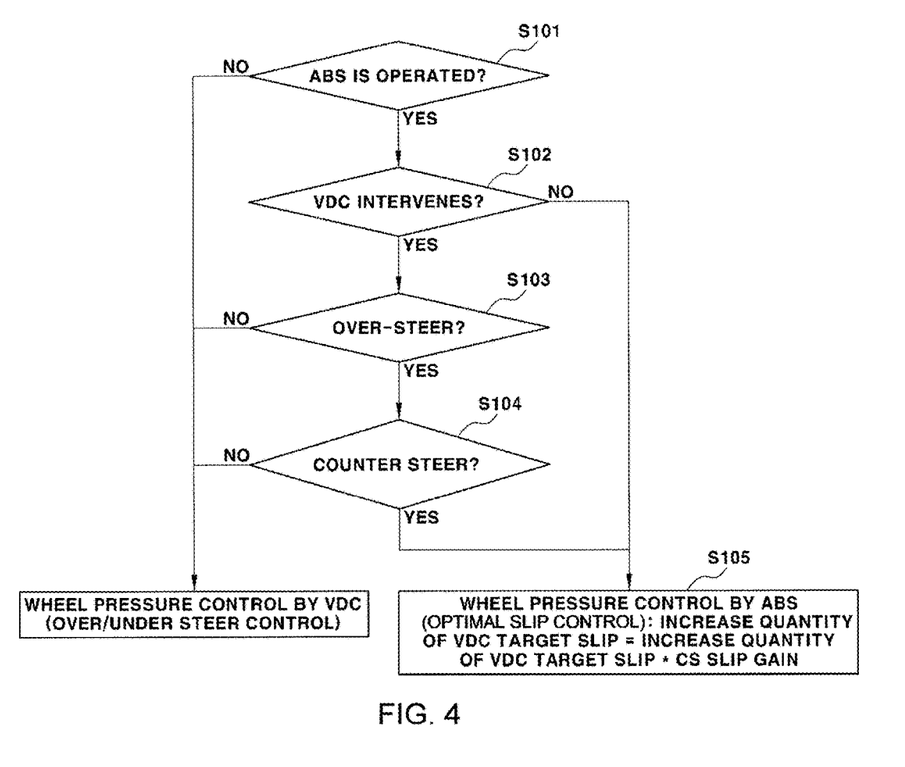
FIG. 4 is a flowchart illustrating a method for controlling counter steering of a vehicle according to the present invention.

FIG. 4 is a flowchart illustrating an example of a method for controlling counter steering of a vehicle according to an exemplary embodiment of the present invention.

A cooperative control of an antilock braking system (ABS) and a vehicle dynamics control (VDC) is required according to an operation S101 of the ABS and an operation S102 of intervention of the VDC in a normal steering section that is a curve-travelling initial section of the vehicle during braking.

Next, it is determined whether a situation is an over-steer situation while the vehicle travels the curve (S103), and the cooperative control of the ABS and the VDC for controlling the over-steer is performed.

Operations subsequent to the operation S102 selectively allows the intervention of the VDS according to the counter steering on the assumption of the over-steer.

Next, it is determined whether the vehicle enters a counter steering section in the over-steer situation (S104).

That is, when the VDC intervenes in the over-steer situation, it is determined whether a corresponding wheel (for example, a front axle curve-travelling outer wheel) is in an ABS control situation and the counter steering is performed.

Next, when it is determined that the vehicle enters the counter steering section, an ABS control, that is, a wheel pressure control by the ABS, in which a braking pressure for a vehicle wheel (for example, the front axle curve-travelling outer wheel) of a counter steering target is maintained at an optimal slip ratio level, is performed by an optimal slip control (S105).

Figure 3:
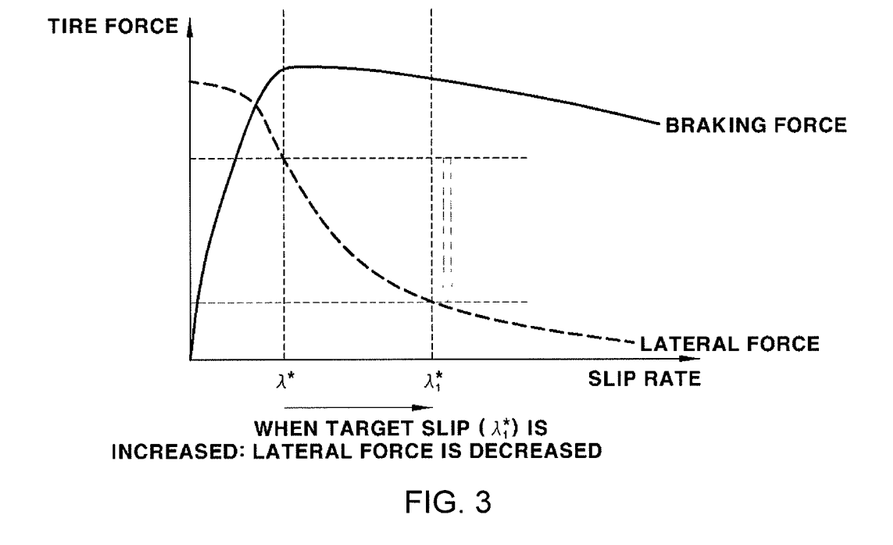
FIG. 3 is a graph illustrating a phenomenon, in which lateral force is decreased by an operation of an ABS in the counter steering section during braking.

In this case, the optimal slip ratio means, referring to FIG. 3, a slip ratio ($\lambda^*$) before an improvement of a target slip ratio.

In the meantime, as illustrated in FIG. 4, in a case where the VDC intervenes in the counter steering section during the ABS braking according to an ABS operation S101, when the curve-travelling outer wheel braking pressure is improved for the over-steer control, there are disadvantages in that lateral force is decreased without an increase in braking force (see the graph of FIG. 3), and the forming of a yaw rate in a steering direction for the counter steering is delayed.

Accordingly, in the exemplary embodiment of the present invention, when it is determined that the vehicle enters the counter steering section during the ABS braking, the VDC does not intervene, and the braking pressure for the vehicle wheel (for example, the front axle curve-travelling outer wheel) of the counter steering target is configured to be controlled at the optimal slip ratio level (the level in which the braking force is maintained as it is, and the lateral force is not decreased, and a level before the target slip ratio) by the ABS, like the operation S105.

Accordingly, it is possible to prevent the lateral force (the lateral force applied in an opposite direction to the curve-travelling direction) form being decreased due to the unnecessary intervention of the VDC, and improve steering performance by forming a linear yaw rate in a direction for the counter steering.

Here, an exemplary embodiment of the operation S104 of determining whether the vehicle enters the counter steering section will be described below.

Figure 6:
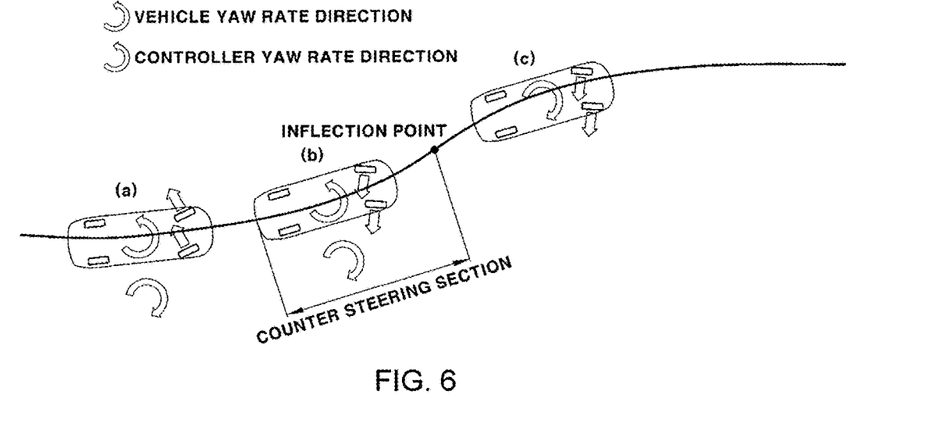
FIG. 6 is a conceptual diagram for describing a section, in which counter steering is performed.

The counter steering section is a section, in which a lateral force direction is opposite to a vehicle curve-travelling direction, that is, a case where a direction of a yaw rate corresponding to the curve-travelling direction of the vehicle is opposite to that of lateral force of the wheel, and is a section between (b) and an inflection point in FIG. 6.

In the operation of determining whether the vehicle enters the counter steering section in the over-steer situation, when a value obtained by multiplying the yaw rate and the lateral force is a negative number, so that the yaw rate and the lateral force are opposite to each other [(yaw rate×lateral force)<0], or when [(yaw rate×tire lateral slip angle)<0] in consideration that the direction of the lateral force is determined based on the tire lateral slip angle, it is determined that the vehicle enters the counter steering section.

Preferably, in an exemplary embodiment of the present invention, it is determined whether the vehicle enters the counter steering section by using a yaw rate signal and a steering angle signal, which are actually easily implemented in the vehicle and are output from a yaw rate sensor and a steering angle sensor as relatively accurate signals.

That is, a counter steer index is calculated by using the yaw rate signal and the steering angle signal in the over-steer situation, and when [counter steer index (yaw rate×vehicle wheel steering angle)<0] or [counter steer index (yaw rate× steering angle)<0] as a result of the calculation, it is determined that the counter steering is performed.

Figure 5:
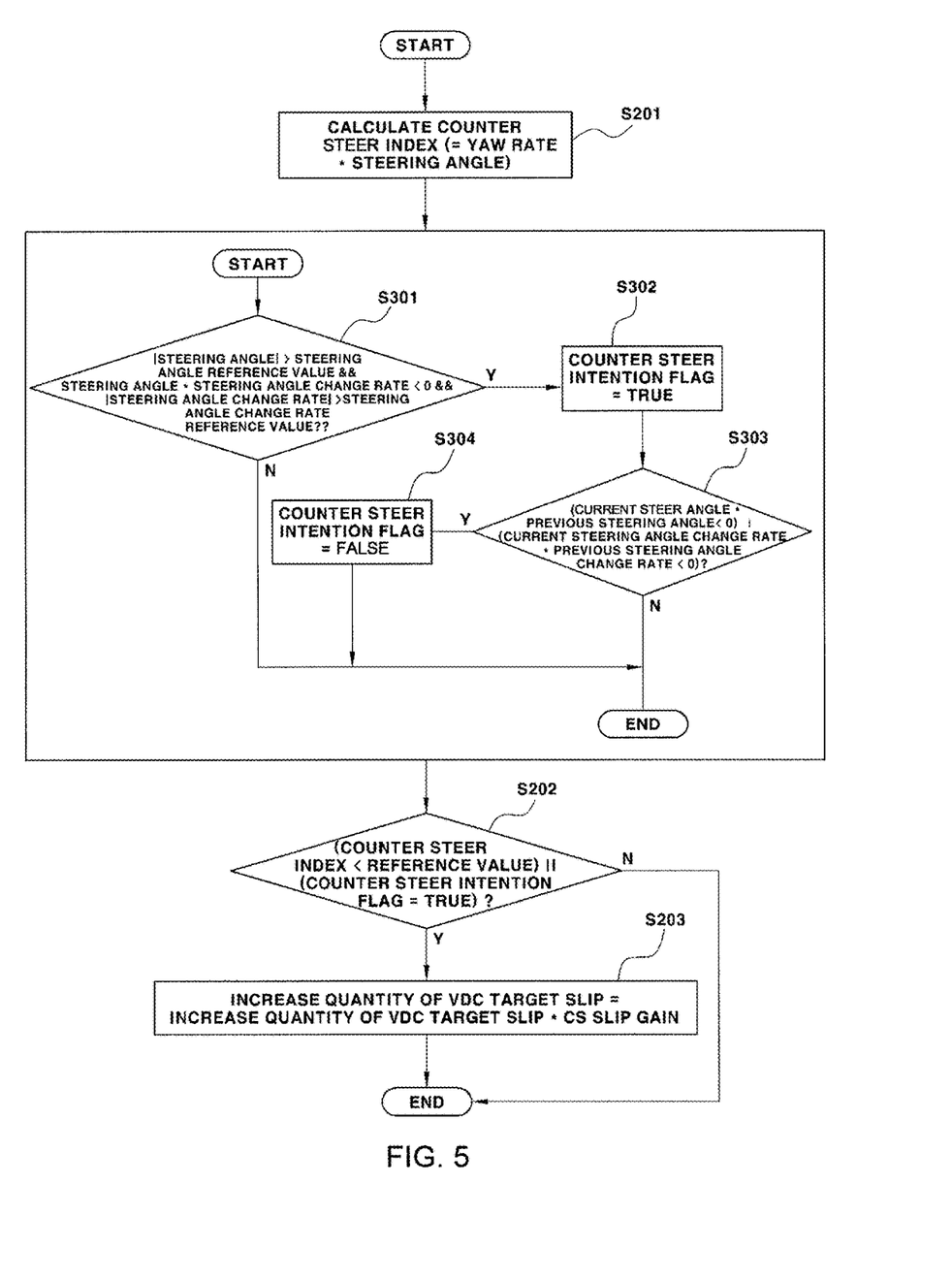
FIG. 5 is a flowchart illustrating a process of predicting counter steering in the method for controlling counter steering of the vehicle according to an exemplary embodiment of the present invention in detail.

In this respect, to determine whether the counter steering is performed in the over-steer situation, the counter steer index (an index value, in which the current counter steering is performed) is determined by using the yaw rate and the steering angle (S201).

Subsequently, when the determined counter steer index is less than zero (0) that is a reference value, it is determined that the counter steering is performed (S202).

For reference, the reference value zero (0) is a steering neutral value between the normal steering (positive number) and the counter steering (negative number).

When it is finally determined that the counter steering is performed in the over-steer situation, an ABS control, that is, a wheel pressure control by the ABS, in which a braking pressure for a vehicle wheel (for example, the front axle curve-travelling outer wheel) of a counter steering target is maintained at an optimal slip level, is performed by an optimal slip control (S203).

As described above, the wheel pressure control by the ABS by the optimal slip control includes applying a braking pressure obtained by multiplying the VDC target slip increase quantity and a counter steer (CS) slip gain to the vehicle wheel.

As described above, when the counter steering is performed in the over-steer situation, the VDC does not intervene and the ABS control, in which the braking pressure for the vehicle wheel (for example, the front axle curve-travelling outer wheel) of the counter steering target is maintained at the optimal slip level is performed, so that it is possible to prevent the lateral force (the lateral force applied in an opposite direction to the curve-travelling direction) from being decreased, and improve steering performance by forming the linear yaw rate in the direction for the counter steering.

In the meantime, since the effect of the ABS optimal slip control performed after the determination (recognition) of the counter steering may be decreased, it is necessary to more rapidly recognize the counter steering.

More particularly, when the ABS optimal slip control is performed after the determination of the counter steering, a phenomenon including a hydraulic pressure response characteristic for the operation of the ABS and an interface communication delay, is generated, so that the ABS optimal slip control may not be properly performed. Therefore, it is desirable that the desired ABS optimal slip control may be performed in an actual counter steering section by predicting the generation of the counter steering in advance.

Here, an exemplary embodiment of the operation of predicting whether the vehicle enters the counter steering section in advance will be described below.

As an exemplary embodiment of the present invention for predicting the generation of the counter steering, it is possible to predict that the counter steering is to be earlier generated by comparing the counter steer index (=steering angle×yaw rate) with a reference value (a small value close to 0, and a positive number larger than 0).

More particularly, after the counter steer index is determined by multiplying a steering angle when the counter steering is performed in the over-steer situation by a yaw rate value, the determined counter steer index is compared with a reference value (a small value close to 0, and a positive number larger than 0), and when the calculated counter steer index is less than the reference value (the small value close to 0, and the positive number larger than 0), it is determined that the counter steering is generated, so that it is possible to determine the counter steering is earlier performed compared to the reference value (zero (0)).

When the generation of the counter steering in the over-steer situation is predicted as described above, the ABS control, that is, the wheel pressure control by the ABS, in which the braking pressure for the vehicle wheel (for example, the front axle curve-travelling outer wheel) of the counter steering target is maintained at the optimal slip ratio level, is performed by the optimal slip control as described above (S203).

Here, another exemplary embodiment of the operation of predicting whether the vehicle enters the counter steering section will be described below with reference to FIG. 5.

Another exemplary embodiment of the present invention for predicting the generation of the counter steering is performed by using an operation of determining a driver's intention flag based on the steering angle.

The reason of using the operation of determining the driver's intention flag is that when the ABS optimal slip control is performed after the determination of the counter steering, a phenomenon including a hydraulic pressure response property for the ABS operation and an interface communication delay, is generated, so that the ABS optimal slip control may not be properly performed.

To this end, another exemplary embodiment of the present invention for predicting the generation of the counter steering is performed by using the steering angle, a change rate of the steering angle, and the like because when the driver directly steers a steering wheel from a forward direction to an opposite direction (for example, when a change rate from a large steering angle in a forward direction to a large steering angle in an opposite direction is generated at a specific moment), it is possible to predict the generation of the counter steering.

First, a steering angle and a steering angle change rate are detected in the over-steer situation by using the steering angle sensor and the like.

As a result of the detection, it is determined whether an absolute value of the steering angle is larger than a steering angle reference value, a value obtained by multiplying the steering angle and the steering angle change rate is less than zero (0), and an absolute value of the steering angle change rate is larger than a steering angle change rate reference value (S301).

As a result of the determination, when the absolute value of the steering angle is larger than the steering angle reference value, the value obtained by multiplying the steering angle and the steering angle change rate is less than zero (0), and the absolute value of the steering angle change rate is larger than the steering angle change rate reference value, it is determined that a counter steer intention flag by the driver is true (S302).

Next, after the operation of predicting and determining that the counter steering is generated as described above, to determine whether the vehicle enters the actual counter steering section, it is determined whether the counter steer intention flag by the driver is true again. The actual counter steering section is determined by the detected counter steer index, and the intention of the driver is used for predicting the generation of the counter steer before the actual counter steering is generated.

Accordingly, it is determined whether a value obtained by multiplying a current steering angle (for example, the steering angle during the counter steering) and a previous steering angle (for example, a steering angle in the over-steer situation) is smaller than zero (0), or a value obtained by multiplying a current steering angle change rate and a previous steering angle change rate is smaller than zero (0) (S303).

As a result of the determination, when the value obtained by multiplying the current steering angle and the previous steering angle is smaller than zero (0), or the value obtained by multiplying the current steering angle change rate and the previous steering angle change rate is smaller than zero (0), it is determined that the vehicle enters the actual counter steering section and it is determined that the counter steer intention flag by the driver is false (S304), and otherwise, the vehicle is continuously and still present in a counter steering generation scheduled section, so that it is maintained that the counters steer intention flag is true.

In this case, when it is determined that the counter steer intention flag is false, it is detected that the counter steering is performed, and in this case, as described above, it is determined that the vehicle enters the counter steering section by the counter steer index, so that the a wheel pressure control is continuously performed based on an optimal slip ratio by the ABS.

When the generation of the counter steering in the over-steer situation is predicted, that is, it is determined that the counter steer intention flag by the driver is true (S202) or it is maintained that the counter steer intention flag is true, the ABS control, that is, the wheel pressure control by the ABS, in which the braking pressure for the vehicle wheel (for example, the front axle curve-travelling outer wheel) of the counter steering target is maintained at the optimal slip level, is performed by the optimal slip control (S203).

As described above, based on the exemplary embodiment and another exemplary embodiment of the present invention of predicting whether the vehicle enters the counter steering section in the over-steer situation, when the generation of the counter steering is predicted, the ABS control, in which a braking pressure for a vehicle wheel (for example, the front axle curve-travelling outer wheel) of a counter steering target is maintained at the optimal slip level, is performed, such that the desired ABS optimal slip control is more smoothly performed in an actual counter steering section, so that it is possible to further prevent the lateral force (the lateral force applied to the opposite direction of the curve-travelling direction) from being decreased, and further improve steering performance by forming a linear yaw rate in the direction for the counter steering.

Figure 7:
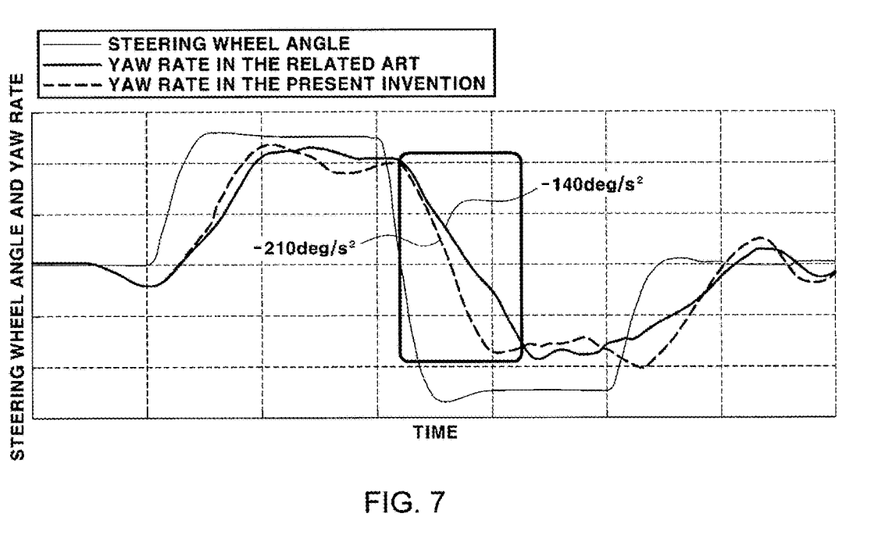
FIG. 7 is a graph of a simulation test result for the method for controlling counter steering of the vehicle according to an exemplary embodiment of the present invention.

In the meantime, FIG. 7 is a graph of a simulation test result for the method for controlling counter steering of the vehicle according to an exemplary embodiment of the present invention, and it can be seen that a yaw rate response characteristic, that is, a yaw angle acceleration, is improved from 140 to 210 deg/s$^2$ compared to the related art, and this means that a linear yaw rate is formed without a delay in forming a yaw rate in the counter steering section.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling counter steering of a vehicle, the method comprising:
    i) determining, by a controller, whether the vehicle is in an over-steer situation while the vehicle travels a curve, and performing a cooperative control of an antilock braking system (ABS) and a vehicle dynamics control (VDC) device in which the ABS and the VDC device concurrently intervene for the over-steer control of the vehicle, when it is determined by the controller that the vehicle is in the over-steer situation;
    ii) determining, by the controller, whether the vehicle enters a counter steering section in the over-steer situation; and
    iii) when it is determined, by the controller, that the vehicle enters the counter steering section in the over-steer situation, performing a wheel pressure control by the antilock braking system (ABS), in which a braking pressure for a vehicle wheel of a counter steering target is maintained at a slip ratio ($\lambda^*$) of the vehicle wheel before an improvement of a target slip ratio without an intervention of the vehicle dynamics control (VDC) device.

2. The method of claim 1, wherein in operation iii), when it is determined that the vehicle does not enter the counter steering section in the over-steer situation, a wheel pressure control by the VDC is performed for the control of an over-steer.

3. The method of claim 1, wherein operation ii) includes:
    determining a counter steer index by multiplying a steering angle when the counter steering is performed in the over-steer situation and a yaw rate value; and
    when the determined counter steer index is less than 0 that is a reference value, determining that the counter steering is generated.

4. The method of claim 1, further comprising:
    before operation iii)
    (a) predicting whether the counter steering is generated based on a steering angle and a yaw rate; and
    (b) when it is predicted that the counter steering is generated, performing the wheel pressure control by the ABS, in which the braking pressure for the vehicle wheel of the counter steering target is maintained at the slip ratio ($\lambda^*$) before the improvement of the target slip ratio.

5. The method of claim 4, wherein operation (a) includes:
    determining a counter steer index by multiplying the steering angle when the counter steering is performed in the over-steer situation and a yaw rate value; and
    comparing the determined counter steer index with a reference value, wherein the reference value is a value close to 0 and a positive number larger than 0, and predicting that the counter-steering is to be generated when the determined counter steer index is less than the reference value.

6. The method of claim 4, wherein operation (a) includes:
    detecting a steering angle and a steering angle change rate in the over-steer situation;

as a result of the detection, determining whether an absolute value of the steering angle is larger than a steering angle reference value, a value obtained by multiplying the steering angle and the steering angle change rate is less than zero (0), and an absolute value of the steering angle change rate is larger than a steering angle change rate reference value; and as a result of the determination, when the absolute value of the steering angle is larger than the steering angle reference value, the value obtained by multiplying the steering angle and the steering angle change rate is less than zero (0), and the absolute value of the steering angle change rate is larger than the steering angle change rate reference value, predicting that the counter steering is to be generated.

7. The method of claim 6, further including:
after the predicting that the counter steering is to be generated,
determining whether a value obtained by multiplying a current steering angle and a previous steering angle is less than zero (0), or a value obtained by multiplying a current steering angle change rate and a previous steering angle change rate is less than zero (0); and
as a result of the determination, when the value obtained by multiplying the current steering angle and the previous steering angle is less than zero (0), or the value obtained by multiplying the current steering angle change rate and the previous steering angle change rate is less than zero (0), determining that the counter steering is generated, and performing the wheel pressure control by the ABS for maintaining the braking pressure for the vehicle wheel of the counter steering target.

8. The method of claim 1, wherein the wheel pressure control of the ABS includes applying a braking pressure obtained by multiplying a VDC target slip increase quantity and a counter steer slip gain to the vehicle wheel of the counter steering target.

9. A method of controlling counter-steering of a vehicle, the method comprising:
i) determining, by a controller, whether the vehicle is in an over-steer situation when the vehicle travels a curve during antilock braking system (ABS) braking;
ii) predicting, by the controller, whether the counter steering is generated based on a steering angle and a yaw rate; and
iii) when it is predicted, by the controller, that the counter steering is generated, performing a wheel pressure control by an ABS, in which a braking pressure for a vehicle wheel of a counter steering target is maintained at a slip ratio ($\lambda^*$) of the vehicle wheel before an improvement of a target slip ratio.

10. The method of claim 9, further including:
operation ii) includes:
determining a counter steer index by multiplying a steering angle when the counter steering is performed in the over-steer situation and a yaw rate value; and
comparing the determined counter steer index with a reference value, wherein the reference value is a value close to 0 and a positive number larger than 0, and predicting that the counter-steering is to be generated when the determined counter steer index is less than the reference value.

11. The method of claim 9, wherein operation ii) includes:
detecting the steering angle and a steering angle change rate in the over-steer situation;
as a result of the detection, determining whether an absolute value of the steering angle is larger than a steering angle reference value, a value obtained by multiplying the steering angle and the steering angle change rate is less than zero (0), and an absolute value of the steering angle change rate is larger than a steering angle change rate reference value; and
as a result of the determination, when the absolute value of the steering angle is larger than the steering angle reference value, the value obtained by multiplying the steering angle and the steering angle change rate is less than zero (0), and the absolute value of the steering angle change rate is larger than the steering angle change rate reference value, predicting that the counter steering is to be generated.

12. The method of claim 11, further including:
after the predicting that the counter steering is to be generated,
determining whether a value obtained by multiplying a current steering angle and a previous steering angle is less than zero (0), or a value obtained by multiplying a current steering angle change rate and a previous steering angle change rate is less than zero (0); and
as a result of the determination, when the value obtained by multiplying the current steering angle and the previous steering angle is less than zero (0), or the value obtained by multiplying the current steering angle change rate and the previous steering angle change rate is less than zero (0), determining that the counter steering is generated, and performing the wheel pressure control by the ABS for maintaining the braking pressure for the vehicle wheel of the counter steering target.

13. The method of claim 9, wherein the wheel pressure control of the ABS includes applying a braking pressure obtained by multiplying a VDC target slip increase quantity and a counter steer slip gain to the vehicle wheel of the counter steering target.

* * * * *